Figure 1:
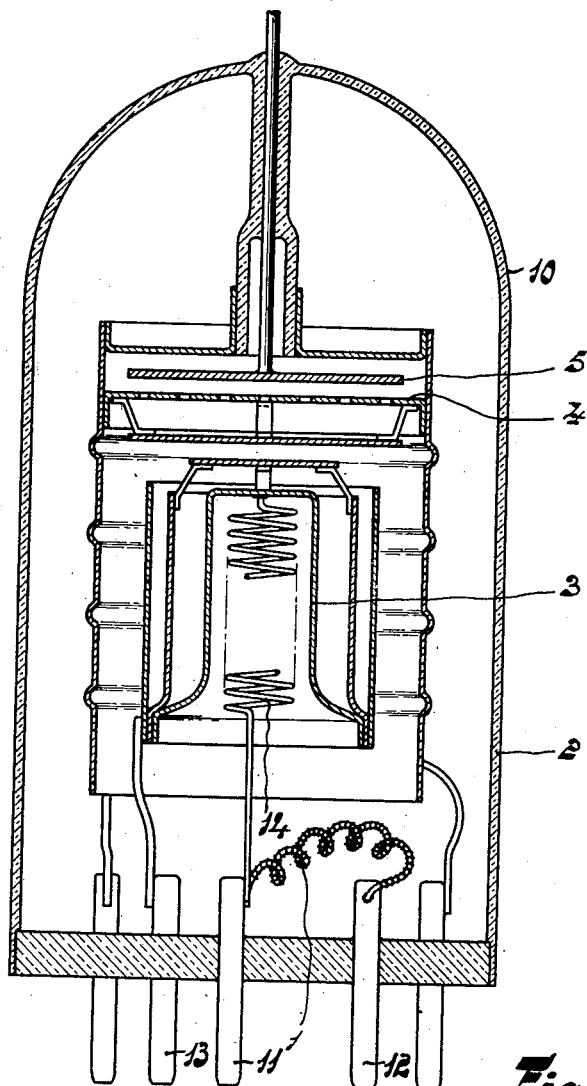

Oct. 9, 1956            K. NIENHUIS            2,766,397

HYDROGEN-FILLED ELECTRIC DISCHARGE DEVICE

Filed March 18, 1952

INVENTOR
Kornelis Nienhuis
By *Fred M Vogel*
Agent

United States Patent Office 2,766,397
Patented Oct. 9, 1956

2,766,397

HYDROGEN-FILLED ELECTRIC DISCHARGE DEVICE

Kornelis Nienhuis, Eindhoven, Netherlands, assignor to Hartford National Bank and Trust Company, Hartford, Conn., as trustee Application March 18, 1952, Serial No. 277,245

Claims priority, application Netherlands April 23, 1951

9 Claims. (Cl. 313—180)

This invention relates to hydrogen-filled electric discharge tubes and to a method for manufacturing such tubes.

The hydrogen pressure in such tubes is maintained by means of a hydrogen replenisher which, heretofore, generally consisted of a solid hydride, in the form of a powder confined in a form of tubule or which was applied to a large surface. The hydride is then heated to a temperature of several hundred degrees centigrade during operation of the tube resulting in a partial decomposition of the hydride and, consequently, the freeing of hydrogen gas until a pre-determined pressure equilibrium occurs within the tube. Since the hydrogen gas pressure is proportional to the temperature of the hydride, the temperautre must be kept constant. Because temperature is a function of the voltage applied to the replenisher, very stable voltage sources must be used. Furthermore, since the size of the replenisher is relatively large, the time for heating the hydride is long. Since the hydride is also generally saturated with hydrogen, the temperature must be low, and consequently, equilibrium in pressure is obtained very slowly. Moreover, the surface of the hydride is readily contaminated by any oxygen or water vapor occurring in the tube which further reduces the reaction velocity in generating free hydrogen.

It is an object of the invention to provide a novel hydrogen replenisher for hydrogen-filled electric discharge tubes which dispenses hydrogen more rapidly during initial operation of the tube.

A further object of the invention is to provide a novel hydrogen replenisher for hydrogen-filled electric discharge tubes which is stable despite fluctuations in the voltage applied to the replenisher.

These and other objects of the invention will appear in the description that follows:

According to the invention, a hydrogen replenisher for a hydrogen-filled electric discharge tube comprises a wire consisting of a metal which is capable of absorbing hydrogen at one temperature and releasing hydrogen at another temperature. This wire has a diameter which is smaller than or equal to the length of the mean free path of a hydrogen molecule and is wholly or partly saturated with hydrogen.

Metals suitable for this purpose are zirconium, titanium, tantalum, cerium and lanthanum.

Since a wire saturated with hydrogen is very brittle, the hydrogen-saturated wire is preferably supported by winding it around a mandrel or base wire of about the same diameter. Metals which are bent with difficulty may be electrolytically applied in the form of a layer on the supporting wire.

Since a metal wire has a low thermal capacity, the amount of heat necessary to free the hydrogen is small and hydrogen is readily liberated. Moreover, the aforesaid ratio between the wire diameter and the length of the mean free path of a hydrogen molecule within the tube provides a satisfactory stability of pressure, because in the range concerned, the thermal conductivity of the wire varies directly with the pressure of the surrounding gas. Consequently, if the pressure is too low, the temperature of the wire increases resulting in hydrogen being liberated, which tends to counteract the increase in temperature. Because of the temperature stability of the wire, the sensitivity thereof to supply voltage fluctuations is reduced.

The metal wire is preferably saturated to about 60 to 70% of hydrogen because, in this range, the pressure of the hydrogen is substantially independent of the degree of saturation. Accordingly, the wire may be mainatined at a higher temperature so that changes in the ambient temperature will have little effect in the operation of the tube.

According to the invention, where higher pressures are desired, i. e., more than 0.6 mm. of mercury, it is preferred to provide a metal tubule enclosing or surrounding the hydrogen-saturated wound wire and having a diameter slightly greater than said wound wire, and maintaining such tubule at a minimum temperature by providing, for example, cooling vanes. Since the thermal conductivity between two surfaces spaced apart by a distance of about the length of the mean free path of a gas molecule varies directly with the pressure of the gas, the pressure will remain substantially constant. Accordingly, the life of hydrogen-filled discharge devices, according to the invention, is materially extended to at least a thousand hours. Furthermore, with the device according to the invention, supply voltage fluctuations of about 20% will not impair the electrical characteristics of the tube.

Figure 2:
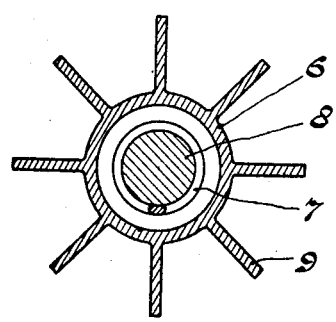

The invention will now be described with reference to the accompanying drawing in which:

Fig. 1 is an elevational view, in cross-section, of one form of gas-filled electric discharge tube in accordance with the invention; and Fig. 2 is a view, in cross-section, of one form of hydrogen replenisher according to the invention.

Referring to Fig. 1, a gas-filled electric discharge device 10, in accordance with the invention, comprises a tubular enclosure or envelope 2 enclosing a cathode 3, a control grid 4, an anode 5 and a filament 14. Two supply pins 11, 13 are connected, respectively, to opposite ends of the filament 14 and serve to supply current from an external circuit thereto.

A hydrogen replenisher 1, comprising a zirconium wire and a tungsten wire, both about 0.1 mm. thick, are wound tightly around one another. The two wound wires are then wound about a second tungsten wire having a thickness of about 0.1 mm. and a length of about 20 cms. The three wires, wound together as a unit and having an effective diameter, i. e., the diameter at which the improved pressure stabilization of the hydrogen filling is produced, of about the mean free path length of the hydrogen gas filling, are then wound about a mandrel having a thickness of about 2.4 mm. to provide a coil form for the unit as shown in the drawing. Opposite ends of the resultant coil are then secured to two supply pins 11, 12, pin 11 also being utilized to supply current to the filament 14.

In processing the tube, it is first evacuated and degasified in a conventional manner and the cathode then activated, i. e. the carbonates decomposed to form electron-emitting oxides. The device is then filled with hydrogen-gas under operational pressure, the cathode activated in the usual manner, and the hydrogen pumped out. During the foregoing operations, the hydrogen replenisher 1 remains cold.

The hydrogen replenisher is then heated to about 900° C. by passing current therethrough while the tube is continuously evacuated so that the zirconium wire is activated to the extent where it is capable of absorbing hydrogen. During this process an oxide layer normally present on the surface of the wire which inhibits hydrogen absorption vanishes toward the interior thereof. Then the zirconium wire is saturated with hydrogen by sintering it several times in a hydrogen atmosphere at about 500–600° C., after which the remaining gas is pumped away.

The temperature of the wire is then raised to between 500 and 600° C. and an amount of hydrogen is pumped away such that the required operational pressure of about 0.5 mm. of mercury is obtained. Under those conditions, the zirconium wire is finally saturated to about 60 to 70% hydrogen gas and contains about 20 times the amount of hydrogen required to fill the tube. After the device has been sealed, the replenisher 1 is connected in parallel with the filament-cathode.

Fig. 2 shows another form of hydrogen replenisher useful in discharge devices having a pressure of more than 0.6 mm. of mercury. In the specific form shown, a molybdenum tubule 6, having cooling vanes 9, surrounds a tungsten wire 8, around which wire 8 is wound a zirconium wire 7. The intermediate spacing between the tubule 6 and the wound wire 7, 8 is only a few tenths of a millimeter. The zirconium wire 7 is then saturated with hydrogen in a similar manner to that described above.

While the invention has been described in connection with specific examples and in specific applications, other modifications thereof will be readily apparent to those skilled in the art without departing from the invention as defined in the appended claims.

What I claim is:

1. A method of manufacturing a hydrogen-filled electric discharge tube having a cathode and a hydrogen replenisher comprising a hydrogen-absorbable metal wire, which comprises the steps of activating said cathode without heating the wire, heating said wire in a vacuum at a temperature of about 900° C. to clean the wire of impurities which prevent absorption of hydrogen, sintering said wire several times in an atmosphere of hydrogen gas at a temperature of about 500 to 600° C. for a time sufficient to saturate the wire with hydrogen, removing the hydrogen atmosphere, and heating the wire saturated with hydrogen at a temperature between about 500° and 600° C. while evacuating the tube to reduce the concentration of hydrogen in said wire to a value between 60 and 70% of saturation.

2. An electric discharge device having a hydrogen filling at a given operating pressure and temperature, said device comprising an enclosure, a plurality of electrodes and a hydrogen replenisher within said enclosure, said replenisher comprising a wire element the surfaces of which are exposed to said hydrogen filling and including a metal selected from the group consisting of zirconium, titanium, tantalum, cerium, and lanthanum, the effective diameter of said wire element being not greater than the length of the mean free path of a hydrogen molecule at said given pressure and temperature, and means for heating the replenisher to maintain the hydrogen pressure within the device.

3. An electric discharge device as set forth in claim 2 wherein the wire element comprises a zirconium metal wire.

4. An electric discharge device as set forth in claim 3, wherein the zirconium wire is partly saturated with about 60 to 70% of hydrogen and is maintained at a temperature of about 500 to 600° C.

5. An electric discharge device having a low pressure hydrogen filling at a given operating pressure and temperature, said device comprising an envelope, a plurality of electrodes and a hydrogen replenisher within said envelope, said replenisher comprising a wire element the surfaces of which are exposed to said hydrogen filling and including a metal selected from the group consisting of zirconium, titanium, tantalum, cerium and lanthanum and being at least partly saturated with hydrogen, the effective diameter of said wire element being of the order of the length of the mean free path of a hydrogen molecule within the device at said given pressure and temperature whereby improved stabilization of the hydrogen pressure within the device may be obtained, and means for passing current through said wire element to heat the replenisher to a relatively high temperature and thereby establish said operating pressure within the device.

6. An electric discharge device as set forth in claim 5 wherein the wire element comprises a plurality of wires including a refractory metal wire and another wire wound about said refractory wire and constituted of a metal selected from the group consisting of zirconium, titanium, tantalum, cerium and lanthanum.

7. An electric discharge device as set forth in claim 5 wherein the wire element comprises a refractory wire and a coating on said wire of a metal selected from the group consisting of zirconium, titanium, tantalum, cerium and lanthanum.

8. An electric discharge device having a hydrogen filling at a given operating pressure and temperature, said device including an envelope, a plurality of electrodes and a hydrogen replenisher within said envelope, said replenisher comprising a refractory metal tubule having cooling vanes and a wire within said tubule and constituted of a metal selected from the group consisting of zirconium, titanium, tantalum, cerium and lanthanum and containing absorbed hydrogen, said wire being spaced from the inner wall of said tubule by a distance not greater than the lenght of the mean free path of a hydrogen molecule within the device at said given pressure and temperature, and means for heating the replenisher to establish said hydrogen pressure within the device.

9. An electric discharge device comprising an envelope and within the envelope a plurality of electrodes and a low pressure hydrogen filling providing a gaseous discharge medium between said electrodes, said hydrogen filling being normally present in an amount producing a given operating pressure of the order of one-half millimeters of mercury within said envelope at a given operating temperature thereof and at said given temperature and pressure said hydrogen medium containing molecules having a given mean free path length, said device further comprising within said envelope a hydrogen replenisher adapted to generate hydrogen in amounts determined by the temperature thereof and means for heating said replenisher to a relatively high temperature, said replenisher comprising a wire element the surfaces of which are exposed to said hydrogen filling and including a metal selected from the group consisting of zirconium, titanium, tantalum, cerium and lanthanum and containing absorbed hydrogen, the effective diameter of said wire element being of the order of the length of the said mean free path, whereby said replenisher may undergo temperature variations as determined by the pressure of the said hydrogen filling thereby to generate and absorb hydrogen and thus to stabilize the hydrogen pressure within the said envelope.

References Cited in the file of this patent

UNITED STATES PATENTS 2,497,911     Reilly et al. _____ Feb. 21, 1950